(12) United States Patent
Takehana

(10) Patent No.: US 11,215,539 B2
(45) Date of Patent: Jan. 4, 2022

(54) EMBEDDING APPARATUS

(71) Applicants: SAKURA SEIKI CO., LTD., Nagano (JP); SAKURA FINETEK JAPAN CO., LTD., Tokyo (JP)

(72) Inventor: Akira Takehana, Nagano (JP)

(73) Assignees: SAKURA SEIKI CO., LTD., Nagano (JP); SAKURA FINETEK JAPAN CO., LTD., Tokyo (JP)

( * ) Notice: Subject to any disclaimer, the term of this patent is extended or adjusted under 35 U.S.C. 154(b) by 0 days.

(21) Appl. No.: 16/966,431

(22) PCT Filed: Jan. 29, 2019

(86) PCT No.: PCT/JP2019/002912
§ 371 (c)(1),
(2) Date: Jul. 30, 2020

(87) PCT Pub. No.: WO2019/151224
PCT Pub. Date: Aug. 8, 2019

(65) Prior Publication Data
US 2021/0055190 A1 Feb. 25, 2021

(30) Foreign Application Priority Data
Feb. 1, 2018 (JP) .............................. JP2018-016566

(51) Int. Cl.
*G01N 1/00* (2006.01)
*G01N 1/36* (2006.01)
*G01N 1/31* (2006.01)

(52) U.S. Cl.
CPC .............. *G01N 1/36* (2013.01); *G01N 1/31* (2013.01)

(58) Field of Classification Search
None
See application file for complete search history.

(56) References Cited

U.S. PATENT DOCUMENTS 5,170,971 A 12/1992 Schaeffer et al.
2003/0219358 A1* 11/2003 Dorenkamp .......... B01L 3/0293
422/400
(Continued)

FOREIGN PATENT DOCUMENTS

| CN | 104048871 A | 9/2014 |
| CN | 1040048871 A | 9/2014 |

(Continued)

OTHER PUBLICATIONS

Japan Patent Office, International Search Report with English Translation, PCT/JP2019/002912, dated May 7, 2019.
(Continued)

*Primary Examiner* — Jyoti Nagpaul
(74) *Attorney, Agent, or Firm* — William Thomas Babbitt, Esq.

(57) ABSTRACT

It is an object of the present invention to provide an embedding apparatus capable of selectively changing a thickness above a hand-rest part of a mechanism for placing a hand. As solving means, the embedding apparatus (10) according to the present invention configured to dispense and embed an embedding material into an embedding tray includes a cold spot (16) configured to cool the embedding tray, a hand-rest part (18) provided on each of left and right sides with the cold spot (16) interposed therebetween, and a wrist-rest part (24) detachably attached onto the hand-rest part (18).

11 Claims, 8 Drawing Sheets

(56) References Cited

U.S. PATENT DOCUMENTS

| | | | |
|---|---|---|---|
| 2007/0114341 A1 | 5/2007 | Raftery | |
| 2009/0318751 A1 | 12/2009 | Lansdowne | |
| 2011/0076753 A1 | 3/2011 | Goerner et al. | |
| 2016/0187238 A1 | 6/2016 | Chen et al. | |

FOREIGN PATENT DOCUMENTS

| | | | |
|---|---|---|---|
| JP | H6008070 U | 2/1994 | |
| JP | H9187344 A | 7/1997 | |
| JP | H11119855 A | 4/1999 | |
| JP | 2002082753 A | 3/2002 | |
| JP | 2002318177 A | 10/2002 | |
| JP | 2006028953 A | 2/2006 | |
| JP | 3142907 U | 7/2008 | |
| JP | 201522407 A | 2/2015 | |
| SE | 518152 C2 | 9/2002 | |
| WO | 2018150986 A1 | 8/2018 | |

OTHER PUBLICATIONS

Japan Patent Office, Written Opinion of the International Searching Authority, PCT/JP2019/002912, dated May 7, 2019.
Sakura Seiki Co. Ltd., et al. Supplementary European Search Report, European Patent Office, Application No. 19747713.6-1001/3680642, PCT2019002912. dated Oct. 16, 2020.

\* cited by examiner

EMBEDDING APPARATUS

TECHNICAL FIELD

The present invention relates to an embedding apparatus configured to dispense and embed an embedding material into an embedding tray.

BACKGROUND ART

In preparing a microscopic specimen of a tissue fragment (sample) collected from a human body or the like, it is necessary to cut the tissue fragment thinly. However, the tissue fragments are generally soft and cannot be cut off thinly. In this configuration, it is necessary to properly harden the tissue fragment with an embedding material (paraffin) to make them easy to cut out. This step is commonly referred to as embedding.

Incidentally, embedding pretreatment (fixing of a tissue fragment, dehydration, degreasing and paraffin penetration) of the collected tissue fragment is widely carried out automatically owing to the spread of an automatic fixing and embedding apparatus. In contrast, embedding of the tissue fragment is mainly performed manually as it requires precise positioning and fixation.

An embedding apparatus is an apparatus that assists in a manual embedding operation (see PTL 1: JP-A-2002-318177). An operator sits in opposition to the apparatus and dispenses a molten paraffin supplied from a dispenser into an embedding tray. A tissue fragment is then placed in the embedding tray. Next, while holding tweezers with one hand and holding the embedding tray with the other hand, the paraffin is solidified on a cooling plate called a cold spot to fix the position of the tissue fragment.

CITATION LIST

Patent Literature

PTL 1: JP-A-2002-318177

SUMMARY OF INVENTION

Technical Problem

In other words, since the embedding is a precise operation performed manually, an embedding apparatus provided with a hand-rest part or a wrist-rest part for the operator to place his or her hand is practically used. As used herein the term "hand-rest part" is intended to mean a flat plate-shaped configuration provided on the embedding apparatus for supporting the hand of the operator. As used herein the term "wrist-rest part" is intended to mean a configuration protruding upward at the position of the hand-rest part with a predetermined thickness. These configurations reduce fatigue of the hand or allow precise operations to be carried out easily by supporting the hand of the operator. However, determination of, for example, which one of these configurations for placing the hand makes the operation easier is different depending on the operator. Therefore, the embedding apparatus provided with either the hand-rest part or the wrist-rest part does not make all the operators satisfy in terms of operability, and thus improvement has been required.

Solution to Problem

In view of the above circumstances, it is an object of the present invention to provide an embedding apparatus capable of selectively changing a thickness above a hand-rest part of a mechanism for placing a hand.

The present invention solves the above problems by means of a solution as described below in one embodiment.

The embedding apparatus according to the present invention configured to dispense and embed an embedding material into an embedding tray includes a cold spot configured to cool the embedding tray, a hand-rest part provided on each of left and right sides with the cold spot interposed therebetween, and a wrist-rest part detachably attached onto the hand-rest part.

In this configuration, a mechanism for placing a hand may be selective changed by providing a wrist-rest part configured to be detachable and attachable onto the hand-rest part. Therefore, an improvement is achieved in operability of an embedding operation.

Preferably, the embedding apparatus includes a first engagement piece and a second engagement piece at a front and a rear with respect to the hand-rest part, respectively, and the wrist-rest part includes a third engagement piece to be disengageably engaged with the first engagement piece at a front thereof and a fourth engagement piece to be disengageably engaged with the second engagement piece at a rear thereof. In this configuration, attachment and detachment of the wrist-rest part is achieved easily by using an engagement mechanism.

Preferably, the embedding apparatus further includes a hot plate configured to heat the embedding tray in rear of the hand-rest part and an inflow groove configured to allow leaked embedding material to flow in between the hand-rest part and the hot plate, the inflow groove includes a protrusion formed at an upper end of an inner wall portion on a side closer to the hand-rest part so as to protrude rearward to serve as the second engagement piece, an apparatus front wall extending downward from a front end of the hand-rest part includes an engagement hole having a recessed shape to serve as the first engagement piece, and the wrist-rest part includes an engagement groove at a rear portion thereof so as to serve as the fourth engagement piece to be engaged with the protrusion and an engagement protrusion formed at a front portion thereof so as to serve as the third engagement piece to be engaged with the engagement hole and is configured to be detachably attached onto the hand-rest part. In this configuration, attachment and detachment of the wrist-rest part is achieved easily by causing the engagement groove or the engagement protrusion of the wrist-rest part to engage the protrusion or the engagement hole of the embedding apparatus. Further, since a structure without provision of the protrusion and the engagement hole relating to the attachment and detachment (engagement) or the hand-rest part is achieved, the hand (glove) of the operator is prevented from being caught by the engagement mechanism when using the hand-rest part.

Preferably, the wrist-rest part is formed into an inclined shape in which an upper surface is declined as it goes away from the cold spot. In this configuration, the hand can be placed on the wrist-rest part in a reasonable position.

Preferably, the wrist-rest part includes a lid opening mechanism configured to open a lid of a cassette configured to accommodate a sample, and the lid opening mechanism includes one end provided at a position lower than a bottom surface of the lid in a state in which the cassette closed by the lid is placed at a predetermined position on the hot plate, and an inclined surface extending from the one end to a position higher than the bottom surface of the lid. In this configuration, the wrist-rest part may be provided with the lid opening mechanism which allows a step of opening the lid of the cassette to be performed with one hand.

Preferably, the inclined surface is inclined in a front-rear direction parallel to a direction opposing the cassette. In this configuration, the wrist-rest part may be provided with the lid opening mechanism which allows opening of the lid of the cassette to be performed only by moving the cassette so as to pull forward with one hand.

Preferably, the lid opening mechanism includes a flip-flop preventing part formed into a canopy top shape above a position of the inclined surface in the vicinity of a portion aligned in height with the bottom surface of the lid. In this configuration, the wrist-rest part may be provided with the lid opening mechanism in which flip-flop movement of the lid is prevented by bringing the upper surface of the lid in contact with a lower surface of the flip-flop preventing part when the lid flips up with an opening force of the lid of the cassette, and thus splashing of the sample that may occur in association with the flip-flop movement of the lid may be prevented.

In addition, as an embodiment different from that described above, the wrist-rest part is preferably provided with an elastic material between a top surface portion and a bottom surface portion, the bottom surface portion is provided with a pressure-sensitive adhesive material, and is configured to be detachably attached onto the hand-rest part by a pressure-sensitive adhesive force of the bottom surface portion. In this configuration, cushioning property may be enhanced by providing the wrist-rest part with elasticity. In addition, attachment and detachment of the wrist-rest part can be carried out easily by sticking and peeling the bottom surface portion of the wrist-rest part onto and from the hand-rest part.

Preferably, the wrist-rest part includes the top surface portion made of a resin material having a convex shape protruding upward, and the bottom surface portion made of a resin material which also serves as both the elastic material and the pressure-sensitive adhesive material. In this configuration, the entire part may be maintained to have a protruding shape while providing the central portion with elasticity.

Preferably, the embedding apparatus further includes a wrist-rest cushion part detachably attached onto the wrist-rest part. In this configuration, the thickness of the wrist-rest part can be changed easily.

In addition, the wrist-rest cushion part is preferably provided with an elastic material between the top surface portion and the bottom surface portion, the bottom surface portion is provided with a pressure-sensitive adhesive material, and is configured to be detachably attached onto the wrist-rest part by a pressure-sensitive adhesive force of the bottom surface portion. In this configuration, attachment and detachment of the wrist-rest cushion part can be carried out easily by sticking and peeling the bottom surface portion of the wrist-rest cushion portion to and from the hand-rest part.

Advantageous Effects of Invention

According to the present invention, the wrist-rest part detachable and attachable to the hand-rest part on the embedding apparatus is achieved. In this configuration, the embedding apparatus capable of selectively changing the thickness above the hand-rest part can be provided.

DESCRIPTION OF EMBODIMENTS

First Embodiment

Figure 1:
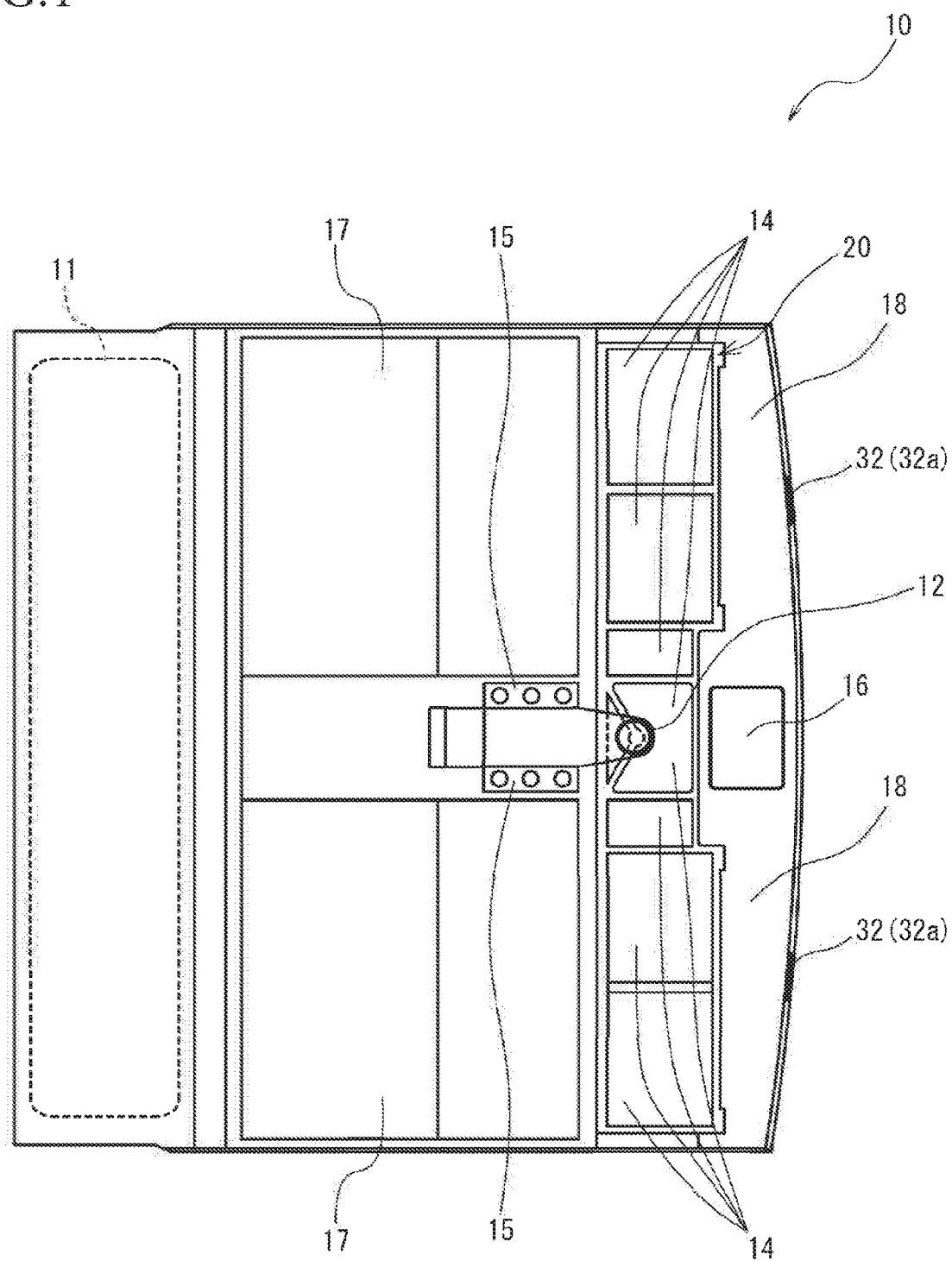
FIG. 1 is a plan view (schematic drawing) illustrating an example of an embedding apparatus according to an embodiment of the present invention.
Figure 2:
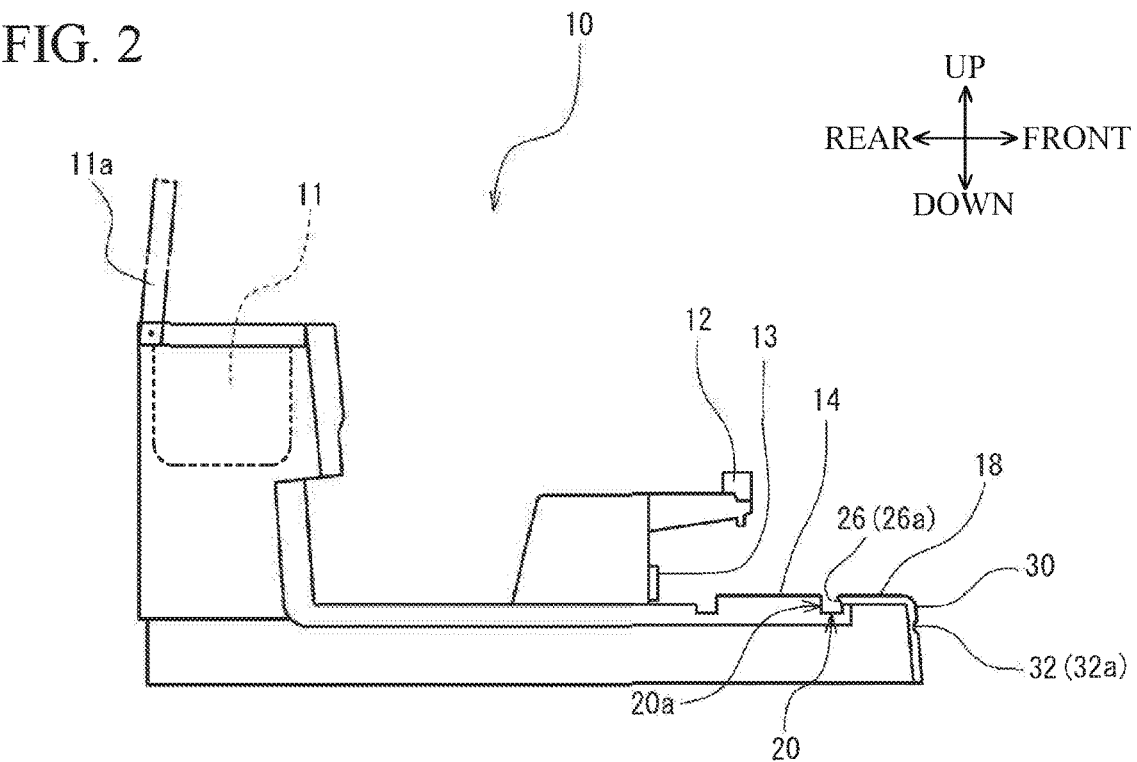
FIG. 2 is a side view (schematic drawing) of the embedding apparatus illustrated in FIG. 1.

Hereinafter, referring to drawings, a first embodiment according to the present invention will be described in detail. FIG. 1 is a plan view (schematic drawing) illustrating a basic configuration of an embedding apparatus 10 according to the embodiment of the present invention, and FIG. 2 is a side view (schematic drawing) thereof. It should be noted that, for convenience of description, front and rear, right and left, and vertical directions of the embedding apparatus 10 are indicated by arrows in the drawings. In all drawings used in describing the embodiments, the same reference numerals will be given to members having the same function, and repeated description thereof will be omitted in some cases.

The embedding apparatus 10 according to the present embodiment illustrated in FIG. 1 and FIG. 2 includes a storage tank 11 in which paraffin as an embedding material is melted and stored. Further, a needle valve 12 serving as a flow control valve located below the liquid level the molten paraffin stored in the storage tank 11, and an open/close switch 13 for an open/close valve provided in a middle of piping connecting the storage tank 11 to the needle valve 12. A cover 11a is mounted to be operable and closable on top of the storage tank 11, and a supply of paraffin or the like to the storage tank 11 can be performed by opening the cover 11a.

A plurality of hot plates 14 configured to heat an embedding tray or the like configured to accommodate a sample are provided at a center and on left and right of the needle valve 12. On the other hand, holders 15 configured to heat an instrument such as tweezers used for taking out a sample from a cassette 42 are provided in left and right rear portions in the vicinity of the needle valve 12.

Further, a cold spot 16 cooled by a Peltier element is provided in front of the needle valve 12. The cold spot 16 is used to solidify molten paraffin filled in an embedding tray in which a sample is accommodated. A hand-rest part 18 extends to ends of the embedding apparatus on the left and right with the cold spot 16 interposed therebetween.

On the other hand, the embedding tray and a heating tank 17 configured to accommodate and warm a sample are provided in the left and right rear portions of the needle valve 12.

Each of the hot plates 14 is partitioned by being surrounded at four sides by an inflow groove 20 having a rail shape. The inflow groove 20 allows the leaked paraffin to flow therethrough and be stored in a waste liquid paraffin tray (not illustrated) provided at a lower portion.

In order to allow an operator to perform the operation regardless of the dominant hand (right hand, left hand) of the operator, the embedding apparatus 10 is configured such that each mechanism is arranged symmetrically with respect to the needle valve 12.

Figure 3:
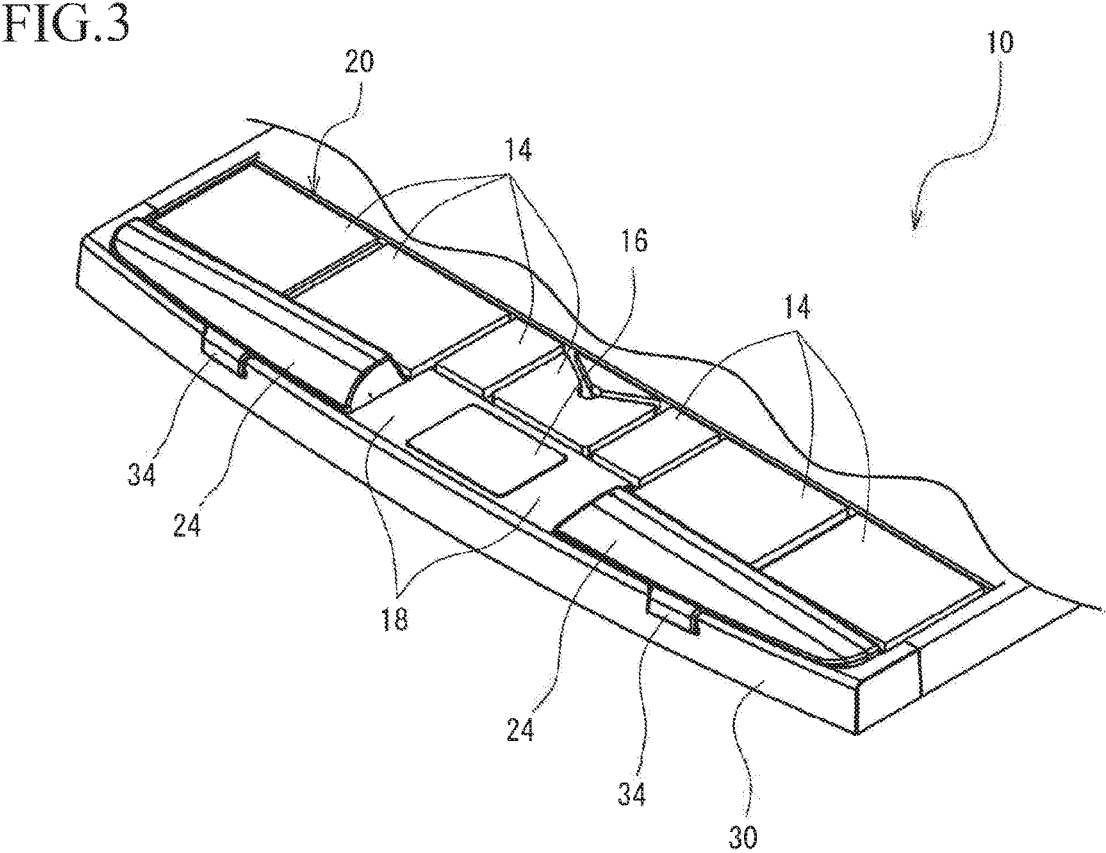
FIG. 3 is a perspective view (schematic drawing) illustrating an example of a wrist-rest part of the embedding apparatus according to a first embodiment of the present invention.
Figure 4:
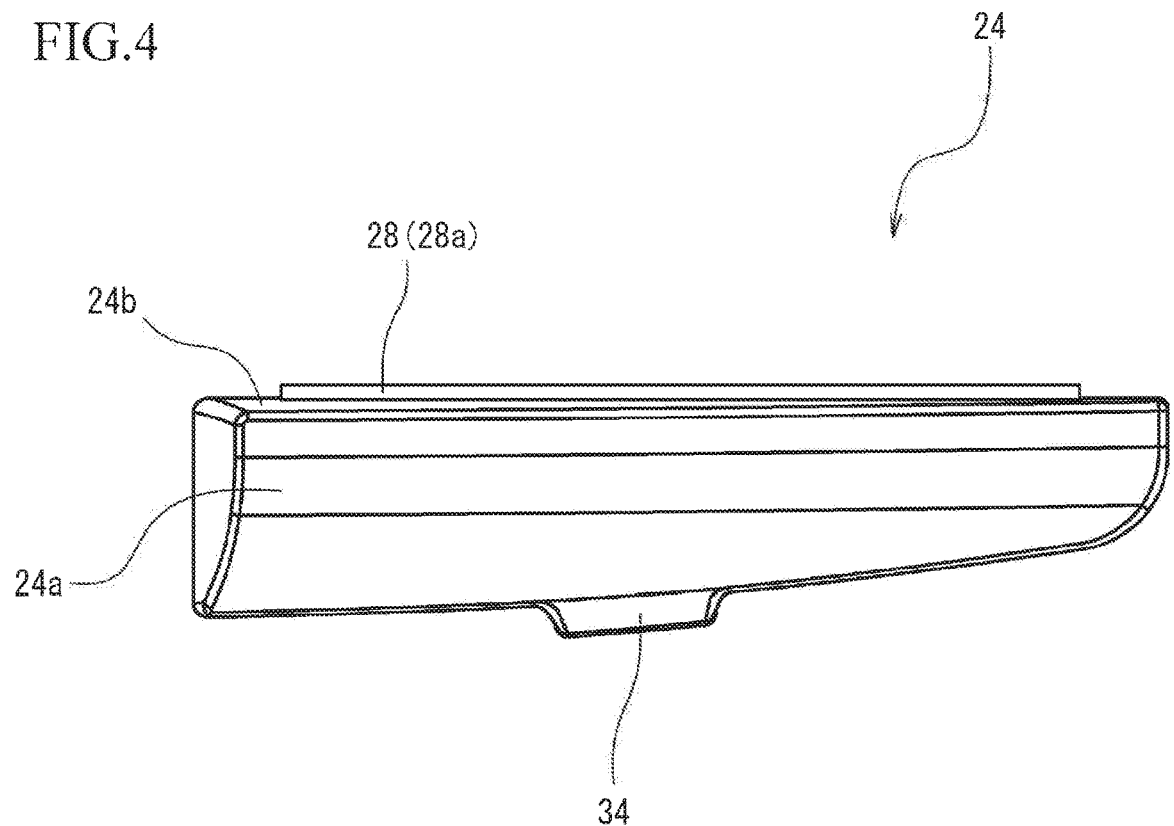
FIG. 4 is a perspective view of the wrist-rest part of the embedding apparatus illustrated in FIG. 3.
Figure 5:
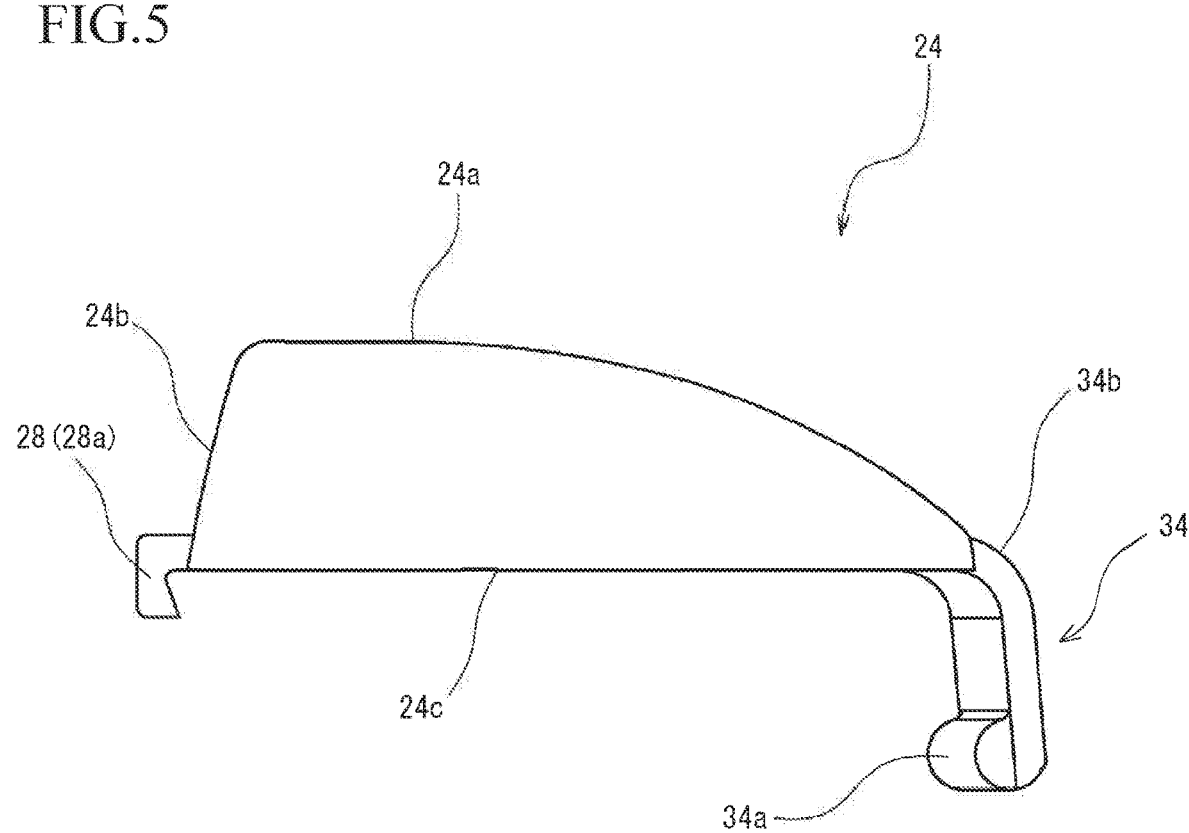
FIG. 5 is a side view of the wrist-rest part of the embedding apparatus illustrated in FIG. 3.

Subsequently, a wrist-rest part 24 which is characteristic of the embedding apparatus 10 according to the present embodiment will be described. FIG. 4 is a perspective view illustrating an example of the wrist-rest part 24, and FIG. 5 is a side view thereof. FIG. 3 is a perspective view (schematic drawing) illustrating an example in which the wrist-rest part 24 is attached to the embedding apparatus 10. Although the wrist-rest part 24 has a pair of configurations arranged symmetrically, only one of them is illustrated and described because the contents thereof overlap with each other.

The wrist-rest part 24 illustrated in FIG. 4 and FIG. 5 is formed in the shape of a wing extending to the left and right sides. Also, the left and right lengths are formed to be shorter than the hand-rest part 18. In this configuration, when the wrist-rest part 24 is attached onto the hand rest part 18 along an end of the embedding apparatus 10, the hand-rest part 18 can remain to a certain extent on both left and right sides sandwiching the cold spot 16 (see FIG. 3). Therefore, the operator can place mainly his or her wrist on the wrist-rest part 24 and place a part ahead of the wrist on the hand-rest part 18, so that the hand can be placed on the wrist-rest part 24 in a reasonable position.

Further, the wrist-rest part 24 is formed in an inclined shape in which a top surface 24a is declined as it goes away from the cold spot 16 and is declined toward the front. In this configuration, the hand can be placed on the wrist-rest part 24 further in a reasonable position.

Figure 6A:
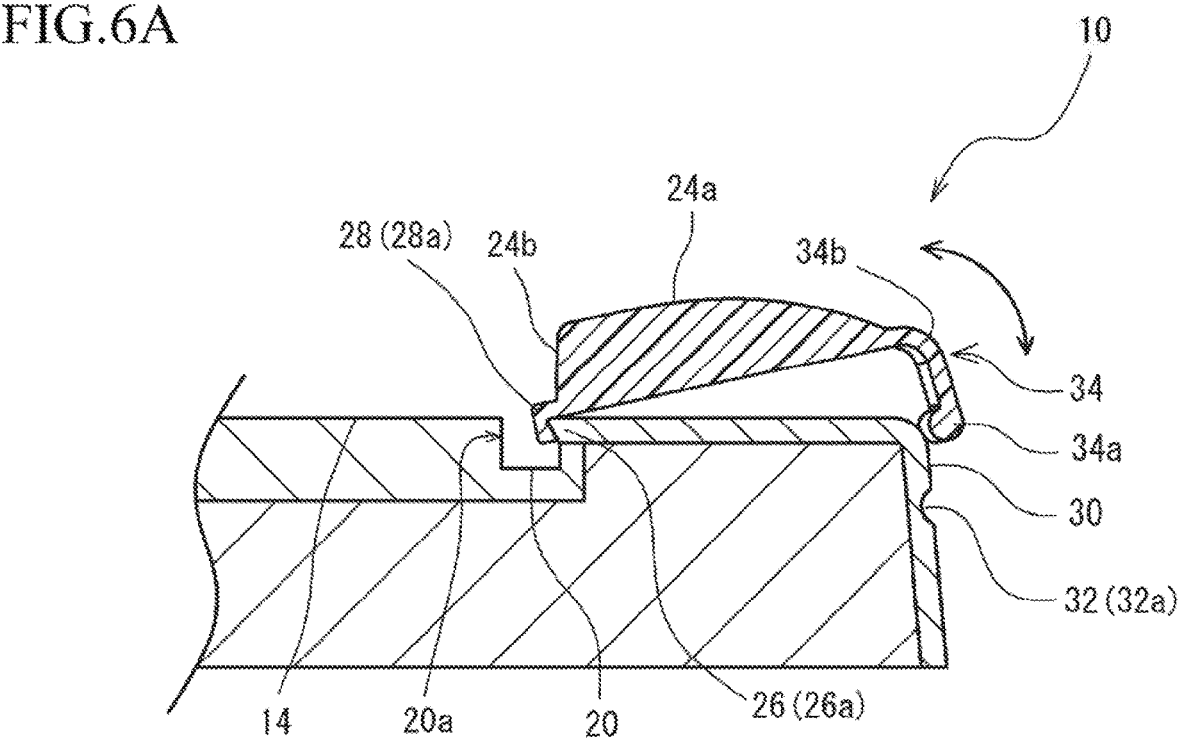
FIGS. 6A and 6B are cross-sectional views illustrating an example of a mechanism relating to engagement of the wrist-rest part of the embedding apparatus illustrated in FIG. 3.
Figure 6B:
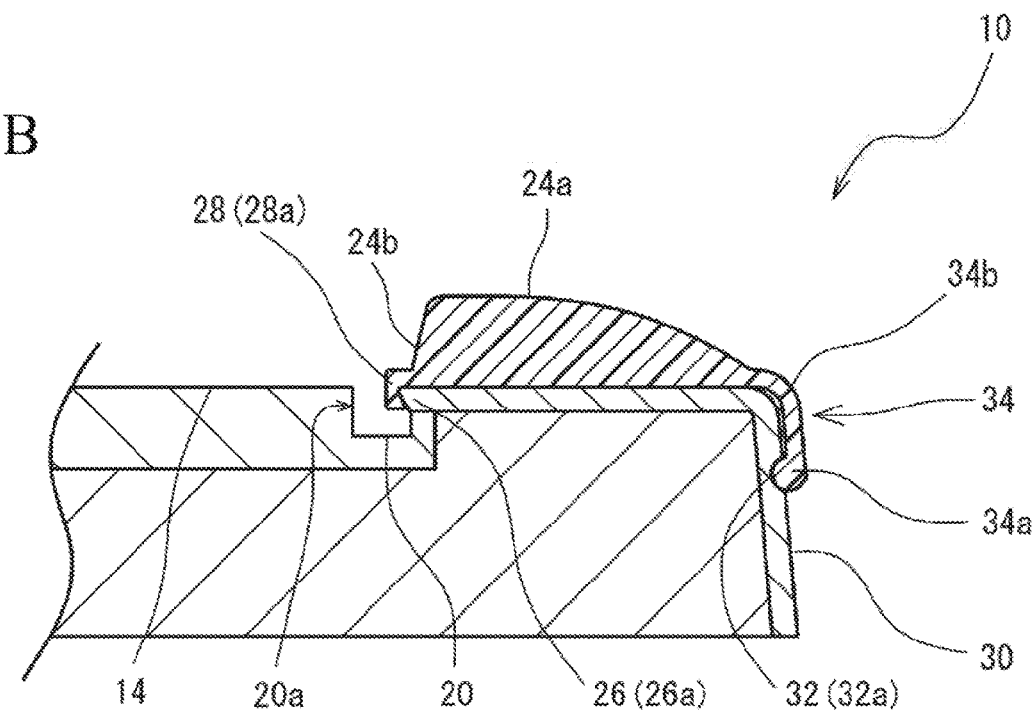

Subsequently, a mechanism relating to the engagement of the wrist-rest 24 will be described. FIGS. 6A and 6B illustrate cross-sectional views illustrating the mechanism relating to the engagement of the wrist-rest part 24. FIG. 6A illustrates a rear mechanism in an attached state, and FIG. 6B illustrates the wrist-rest part 24 attached onto the hand-rest part 18 by engaging the rear and front mechanisms.

In the embedding apparatus 10, the inflow groove 20 is provided between the hand-rest part 18 and the hot plate 14 located rearward of the hand-rest part 18 includes a protrusion 26a formed to protrude rearward at an upper end of an inner wall portion 20a on a side closer to the hand-rest part 18 (see FIG. 2 and FIG. 6A). The protrusion 26a is configured as a second engagement piece 26 which a fourth engagement piece 28 on the wrist-rest part 24, which will be described later, engages.

On the other hand, a hook-shaped engagement groove 28a is provided to extend to the left and right at a lower end of a rear edge portion 24b of the wrist-rest part 24 (see FIG. 4 and FIG. 5). The engagement groove 28a is configured as the fourth engagement piece 28 that engages the second engagement piece 26 in the aforementioned hand-rest part. Therefore, the engagement groove 28a is provided to be capable of engaging the protrusion 26a of the second engagement piece 26. In other words, a hook shape of the engagement groove 28a is formed to match the shape of the protrusion 26a. In this configuration, as illustrated in FIG. 6A, the wrist-rest part 24 is freely movable up and down with the engagement groove 28a in engagement with the protrusion 26a.

It should be noted that, although the engagement mechanism at the rear portion of the wrist-rest part 24 described above according to the present embodiment is extended from the center to the left and right as an example, the size (length), the position, and the number are not limited thereto.

A recessed engagement hole 32a having a required length and a required width is formed in an apparatus front wall 30 extending downward from a front end of the hand-rest part 18 of the embedding apparatus 10 (see FIG. 2 and FIG. 6A). The engagement hole 32a is configured as a first engagement piece 32 which a third engagement piece 34 on the wrist-rest part 24, which will be described later, engages.

On the other hand, at a lower end of the front portion of the wrist-rest part 24, the third engagement piece 34 protruding downward by an L-shape is provided (see FIG. 4 and FIG. 5). The third engagement piece 34 has a required length and a required width and, in addition, includes an engagement protrusion 34a protruding inward formed at the lower end.

The wrist-rest part 24 here is made of a material elastically deformable in inward and outward direction at an L-shaped bent portion 34b. In this configuration, when the wrist-rest part 24 is moved downward with the second engagement piece 26 in engagement with the fourth engagement piece 28, the third engagement piece 34 can be deflected outward and lowered along the apparatus front wall 30. Therefore, a bottom surface portion 24c of the wrist-rest part 24 can be brought into contact with the hand-rest part 18. Examples of the material that can be used for the wrist-rest part 24 include resin materials such as polyamide 6 (PA6).

On the other hand, the engagement hole 32a on the front side of the hand-rest part 18 is provided to be capable of engaging the engagement protrusion 34a of the third engagement piece 34 on the wrist-rest part 24. In other words, the engagement hole 32a is provided at a position where the engagement protrusion 34a comes into contact with the apparatus front wall 30 when the wrist-rest part 24 is moved downward with the second engagement piece 26 in engagement with the fourth engagement piece 28 and the bottom surface portion 24c of the wrist-rest part 24 is brought into contact with the hand-rest part 18. In this configuration, when the bottom surface portion 24c of the wrist-rest part 24 is brought into contact with the hand-rest part 18, the engagement protrusion 34a can be brought into engagement with the engagement hole 32a.

In other words, the third engagement piece 34 and the first engagement piece 32 constitute an engagement mechanism by snap fitting. In this configuration, the engagement or separation is achieved easily.

It should be noted that, although one engagement mechanism is provided at the center of the front portion of the wrist-rest part 24 described above according to the present embodiment as an example, the size, (length), the position, and the number are not limited thereto.

According to the configuration described above, the first engagement piece 32 can engage or separate from the third engagement piece 34 by moving the wrist-rest part 24 up and down with the fourth engagement piece 28 in engagement with the second engagement piece 26. As a result, attachment and detachment of the wrist-rest part 24 is achieved easily.

Further, since the first engagement piece 32 and the second engagement piece 26 relating to the attachment and detachment of the wrist-rest part 24 are not provided on the hand-rest part 18, such a defect that the hand (glove) of the operator is caught by the engagement mechanism when using the hand-rest part 18 may be avoided.

Although the engagement mechanism of the wrist-rest part 24 according to the present embodiment is disposed at the front and rear positions with the hand-rest part 18 interposed therebetween, it is also possible to dispose the engagement mechanism of the wrist-rest part 24 at left and right positions. It is also possible to configure an attachment mechanism by using only one of the two engagement mechanisms (first engagement piece and third engagement piece, and second engagement piece and fourth engagement piece).

Figure 7:
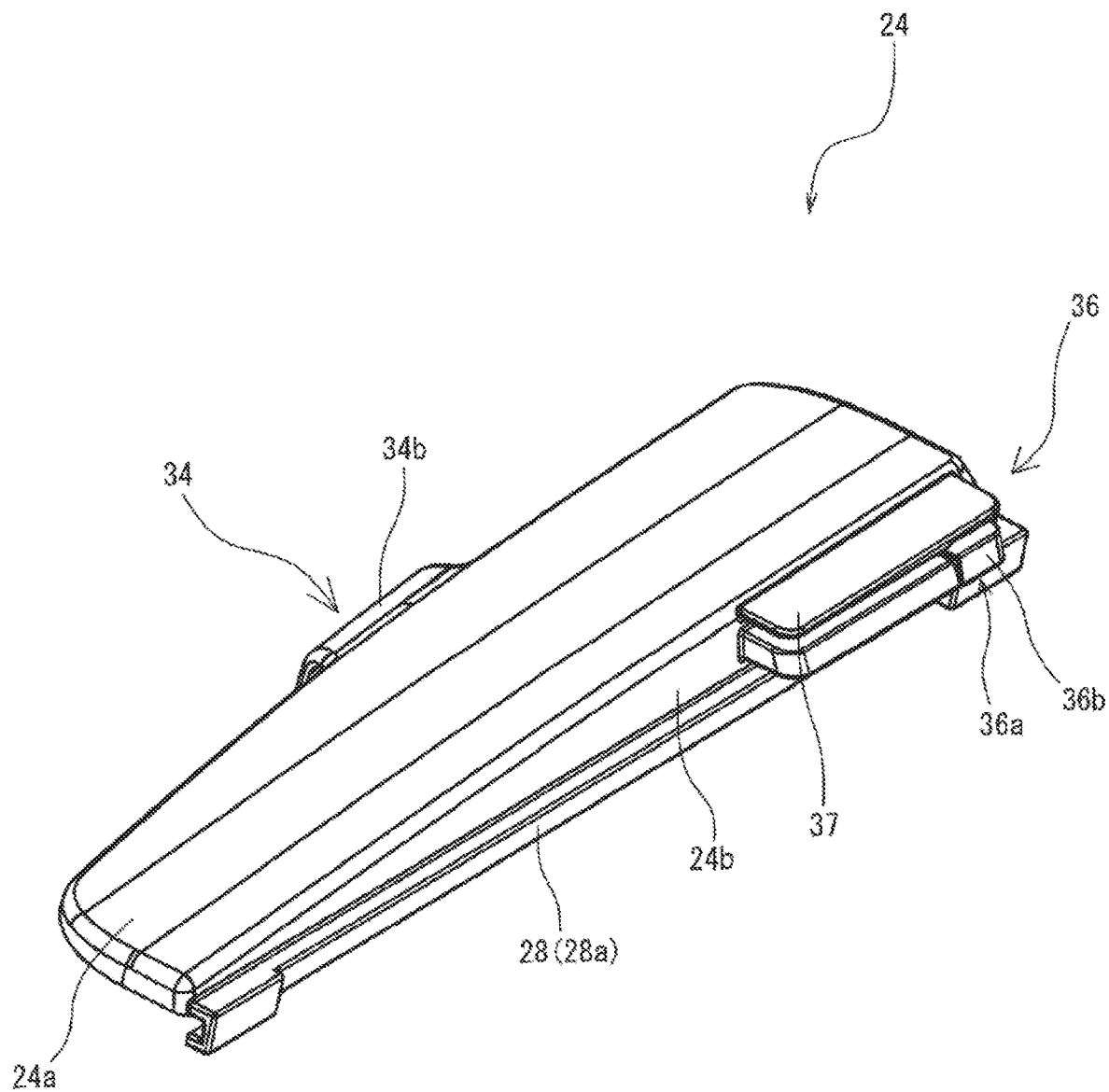
FIG. 7 is a perspective view (schematic drawing) illustrating another example of a wrist-rest part of the embedding apparatus according to the first embodiment of the present invention.
Figure 8:
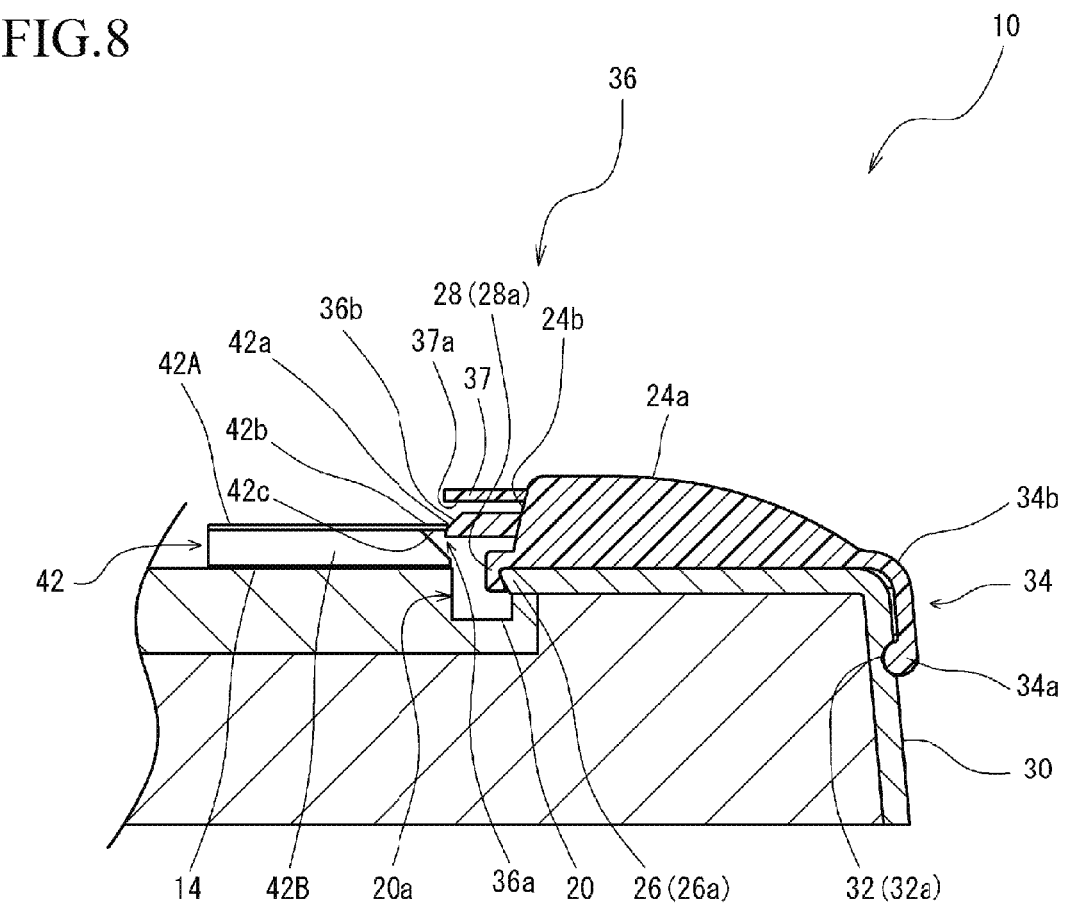
FIG. 8 is a cross-sectional view illustrating an example of a lid opening mechanism of the wrist-rest part of the embedding apparatus illustrated in FIG. 7.
Figure 9:
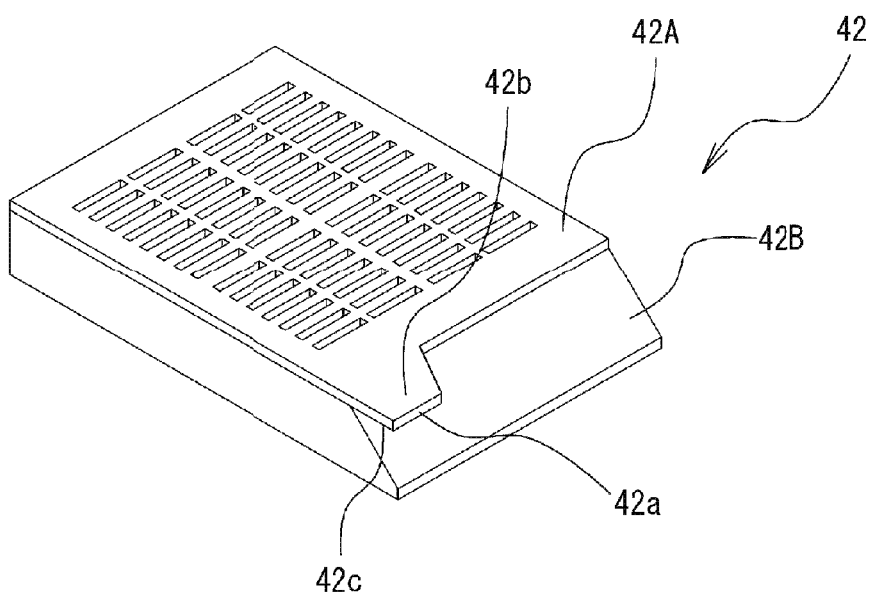
FIG. 9 is a perspective view illustrating an example of a cassette configured to accommodate a sample.

As a modified example, the wrist-rest part 24 according to the present embodiment may be provided with a lid opening mechanism 36 capable of opening a lid 42A of the cassette 42 configured to accommodate a sample with one hand. FIG. 7 is a perspective view illustrating an example of the wrist-rest part 24 provided with the lid opening mechanism 36, and FIG. 8 is a cross-sectional view illustrating an example in which the wrist-rest part 24 is attached to the embedding apparatus 10 and the cassette 42 is placed on the hot plate 14. An example of the cassette 42 is illustrated in a perspective view in FIG. 9.

The lid opening mechanism 36 includes one end portion 36a provided at a position where a height in the vertical direction is lower than a bottom surface 42c of the lid 42A provided so as to be openable and closable on a main body 42B of the cassette 42 with the cassette 42 in which the lid 42A is closed placed at a predetermined position on the hot plate 14, and an inclined surface 36b extending from the one end portion 36a to a position higher than the bottom surface 42c of the lid 42A in the vertical direction.

The inclined surface 36b is configured to be inclined in the direction parallel to the direction opposite to the cassette 42, that is, in the front-rear direction. As an example, a distal end of the one end portion 36a is formed to have a substantially V-shaped cross section (cross-sectional shape when taken along a plane perpendicular to the left and right direction), that is, a tapered shape having an acute angle (see FIG. 8).

In this configuration, by performing such an operation that a front end 42a of the lid 42A of the cassette 42 is brought into contact with the inclined surface 36b of the lid opening mechanism 36, and then the cassette 42 is pulled forward from this state, the front end 42a of the lid 42A is raised along the inclined surface 36b, thereby achieving an opening action of the lid 42A.

In this manner, according to the lid opening mechanism 36 described above, the lid 42A can be opened only by moving the cassette 42 so as to be pulled forward by one hand while holding the tweezers with the other hand. Therefore, since the lid 42A of the cassette 42 can be opened without returning the tweezers held in the hand to the holder 15, the operation can be simplified, and the operating time can be reduced.

In addition, the lid opening mechanism 36 includes a flip-flop preventing part 37 formed into a canopy top shape above a position of the inclined surface 36b in the vicinity of the portion aligned in height in the vertical direction with the bottom surface 42c of the lid 42A.

Here, when the lid 42A is opened by the lid opening mechanism 36, the lid 42A may flip up due to the opening force. However, according to the flip-flop preventing part 37 described above, when the lid 42A flips up, a top surface 42b of the lid 42A comes into contact with a bottom surface 37a of the canopy top shaped flip-flop preventing part 37, so that an effect of suppressing the flip-flop movement is achieved. In this configuration, the flip-flop movement of the lid 42A which may occur as a problem specific for opening of the lid 42A by the lid opening mechanism 36 can be prevented, so that splashing of the sample caused by the flip-flop movement of the lid 42A can be prevented.

Second Embodiment

Subsequently, a second embodiment of the present invention will be described. The embedding apparatus 10 according to the present embodiment is basically the same as the embedding apparatus 10 according to the first embodiment but is different specifically in configuration of the wrist-rest part 24. Hereinafter, the different point of the present embodiment will be mainly described.

Figure 10:
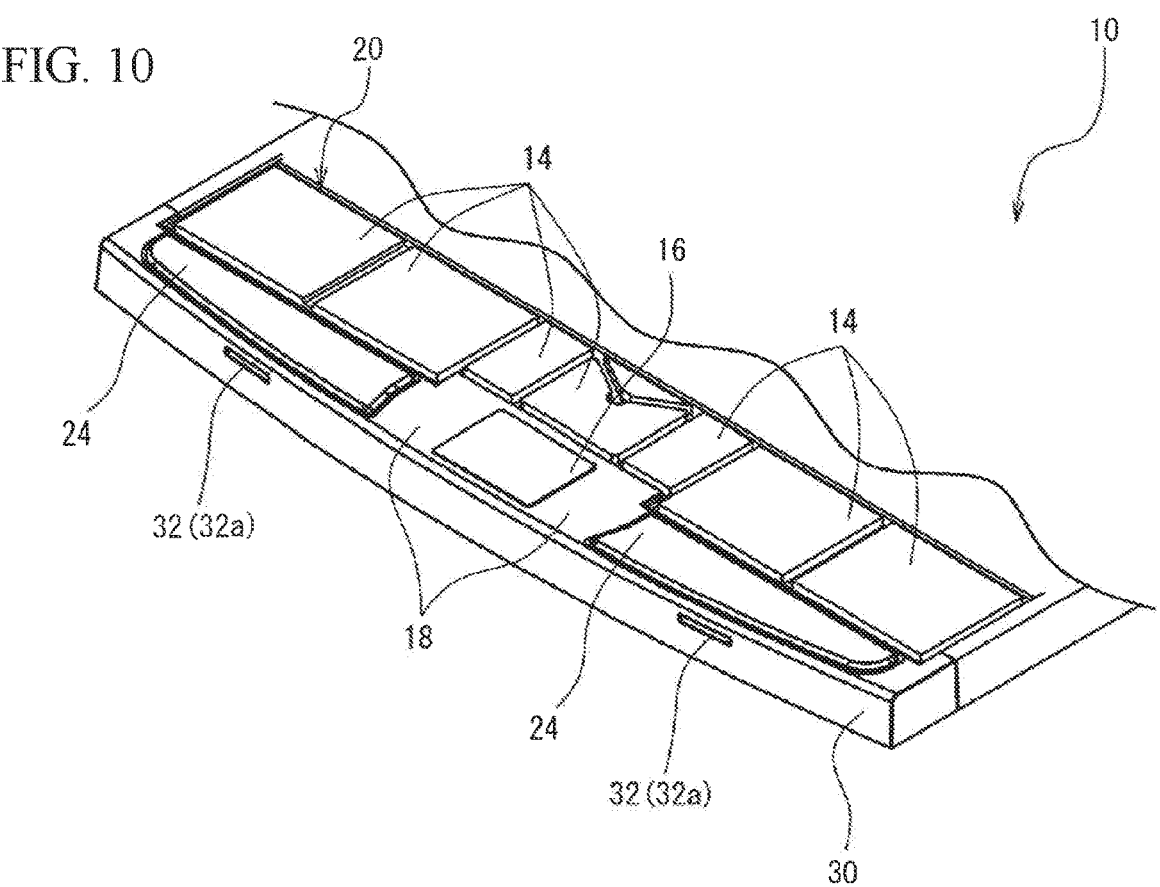
FIG. 10 is a perspective view (schematic drawing) illustrating an example of a wrist-rest part of an embedding apparatus according to a second embodiment of the present invention.
Figure 11:
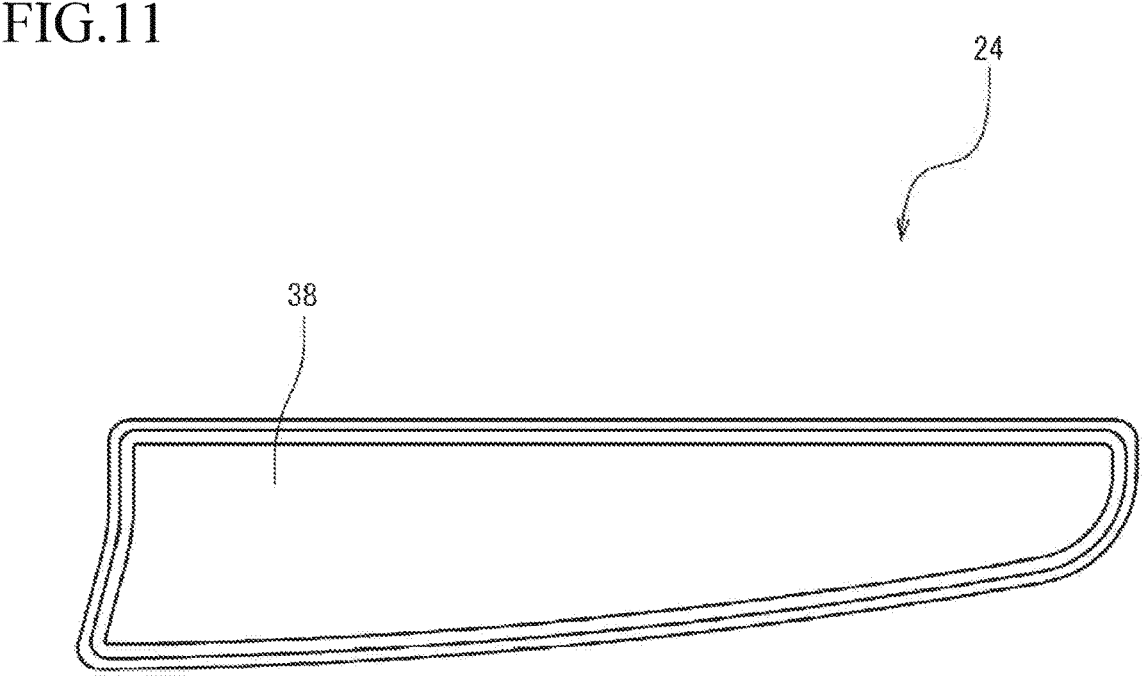
FIG. 11 is a plan view of the wrist-rest part of the embedding apparatus illustrated in FIG. 10.
Figure 12:
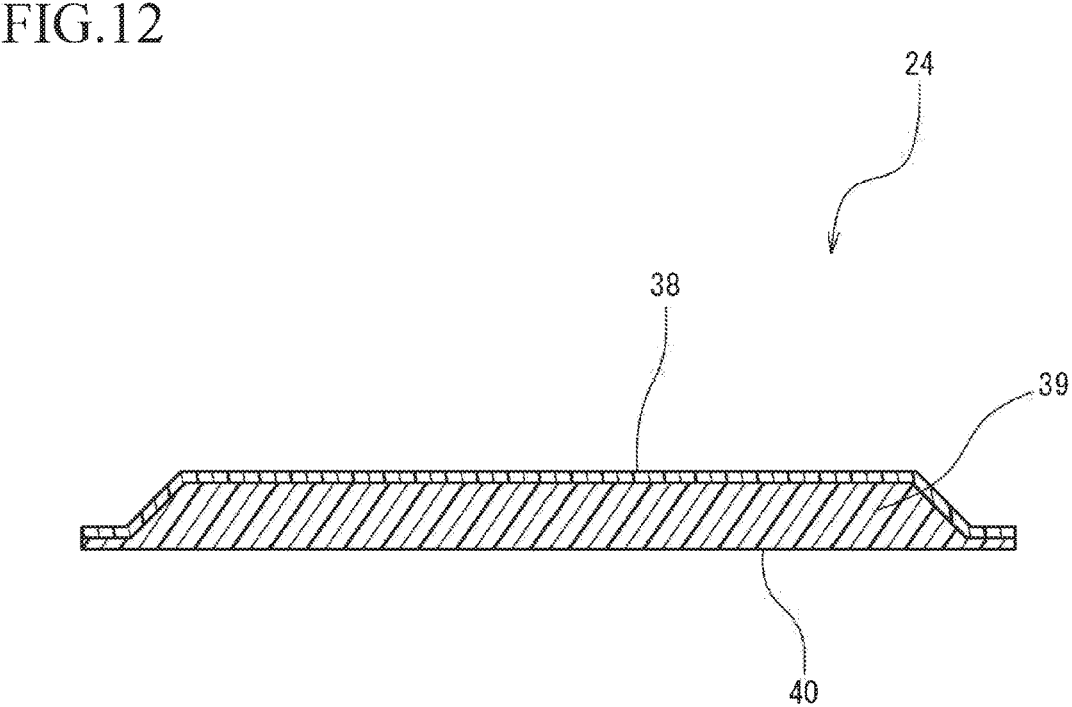
FIG. 12 is a cross-sectional view of the wrist-rest part of the embedding apparatus illustrated in FIG. 10.

FIG. 11 is a plan view illustrating an example of the wrist-rest part 24, and FIG. 12 is a cross-sectional view of the same. FIG. 10 is a perspective view (schematic drawing) illustrating an example in which the wrist-rest part 24 is attached to the embedding apparatus 10. Although the wrist-rest part 24 has a pair of configurations arranged symmetrically, only one of them is illustrated and described because the contents thereof overlap with each other.

The wrist-rest part 24 according to the present embodiment is common to the wrist-rest part 24 in the first embodiment in shape in plan view (see FIG. 3 and FIG. 10).

In contrast, the wrist-rest part 24 according to the present embodiment illustrated in FIG. 11 and FIG. 12 includes an elastic material in a central portion 39 between a top surface portion 38 and a bottom surface portion 40 and a pressure-sensitive adhesive material on the bottom surface portion 40. In this configuration, cushioning property may be enhanced by providing the wrist-rest part 24 with elasticity. In addition, attachment and detachment of the wrist-rest part 24 can be carried out easily by sticking and peeling the bottom surface portion 40 of the wrist-rest part 24 onto and from the hand-rest part 18.

It should be noted that, in the present embodiment, the central portion 39 and the bottom surface portion 40 are formed of urethane gel which also serves as both an elastic material and a pressure-sensitive adhesive material, but may also be formed of different materials, respectively. The wrist-rest part 24 having a desired elasticity or pressure-sensitive adhesive property can be produced by selecting a material as appropriate.

Further, the top surface portion 38 of the wrist-rest part 24 according to the present embodiment is made of a resin material having a convex shape protruding upward. In this configuration, the entire part may be maintained to have a protruding shape while providing the central portion 39 with elasticity.

In the present embodiment, the top surface portion 38 is made of a urethane leather having non-pressure-sensitive adhesive property and a low frictional resistance. In this configuration, the operator's hand (glove) can be prevented from sticking to or being caught on the wrist-rest part 24.

According to the configuration described above, attachment and detachment of the wrist-rest part 24 according to the present embodiment to and from the wrist-rest part 24 can easily be achieved by the pressure-sensitive adhesive force of the bottom surface portion 40. In addition, the wrist-rest part 24 having a desired elasticity or pressure-sensitive adhesive property can be produced.

Third Embodiment

Subsequently, a third embodiment of the present invention will be described. The embedding apparatus 10 according to the present embodiment is basically the same as the embedding apparatus 10 according to the first and second embodiments but is different, for example, in that a wrist-rest cushion part 25 is detachably attached onto the wrist-rest part 24.

The wrist-rest cushion part 25 according to the embodiment of the present invention may be provided on the wrist-rest part 24 according to the first embodiment or may be provided on the wrist-rest part 24 according to the second embodiment. An example in which the wrist-rest cushion part 25 is attached to the wrist-rest part 24 according to the second embodiment is illustrated in a perspective view in FIG. 13.

Figure 13:
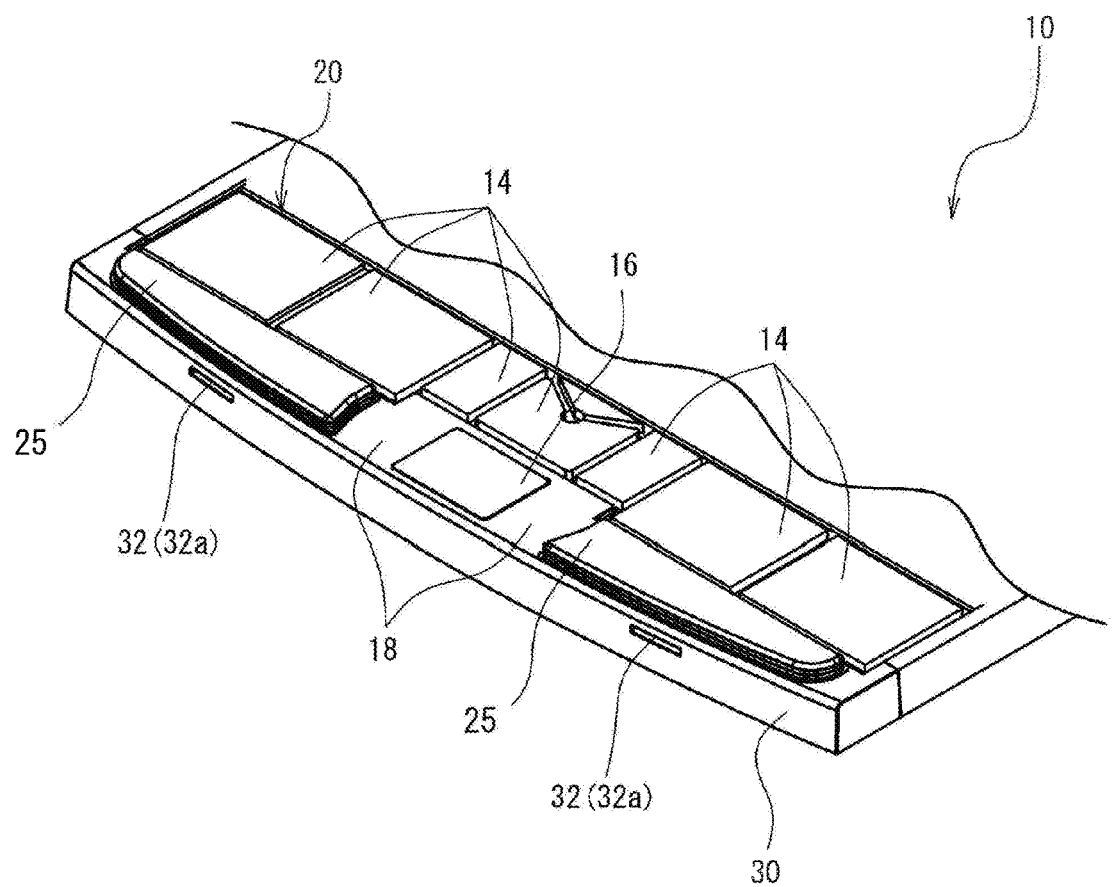
FIG. 13 is a perspective view (schematic drawing) illustrating an example in which a wrist-rest cushion part of an embedding apparatus according to a third embodiment of the present invention.

Here, the configuration of the wrist-rest cushion part 25 may be the same as the configuration of the wrist-rest part 24 according to the second embodiment (see FIG. 13). In this configuration, the wrist-rest cushion part 25 may be stuck by means of the pressure-sensitive adhesive force of the bottom surface portion 40. As a result, the thickness of the wrist-rest part 24 can be adjusted easily and selectively.

Further, the wrist-rest cushion part 25 having a desired elasticity or pressure-sensitive adhesive property can be produced by appropriately selecting a material. As a result, the cushioning properties of the wrist-rest part 24 can be easily and selectively adjusted by sticking the wrist-rest cushion part 25 thereto.

As described thus far, according to the embedding apparatus of the present invention, a wrist-rest part can be detachably attached onto the hand-rest part and, in addition, the wrist-rest cushion part can be detachably attached onto the wrist-rest part. In this configuration, the thickness over the hand-rest part can be selectively changed. In addition, attachment and detachment of the wrist-rest part and the wrist-rest cushion part can be performed easily by the engagement mechanism or the pressure-sensitive adhesive force. Further, by sticking the wrist-rest cushion part having elasticity, the thickness and cushioning properties of the wrist-rest part can be easily and selectively adjusted. As a result, the original purpose of the hand-rest part or the wrist-rest part is achieved for any operator, so that fatigue of the hand is reduced, and the embedding apparatus that facilitates the precisive operation is provided.

The present invention is not limited to the examples described above and may be modified variously without departing the scope of the present invention.

What is claimed is:

1. An embedding apparatus configured to dispense and embed an embedding material into an embedding tray, comprising:
   a cold spot configured to cool the embedding tray,
   a hand-rest part provided on each of left and right sides with the cold spot interposed therebetween, and
   a wrist-rest part detachably attached onto the hand-rest part.

2. The embedding apparatus according to claim 1, a first engagement piece and a second engagement piece at a front and a rear with respect to the hand-rest part, respectively, and the wrist-rest part includes a third engagement piece to be disengageably engaged with the first engagement piece at a front thereof and a fourth engagement piece to be disengageably engaged with the second engagement piece at a rear thereof.

3. The embedding apparatus according to claim 2, further comprising a hot plate configured to heat the embedding tray in rear of the hand-rest part and an inflow groove configured to allow leaked embedding material to flow in between the hand-rest part and the hot plate,
   wherein the inflow groove includes a protrusion formed at an upper end of an inner wall portion on a side closer to the hand-rest part so as to protrude rearward to serve as the second engagement piece,
   an apparatus front wall extending downward from a front end of the hand-rest part includes an engagement hole having a recessed shape to serve as the first engagement piece, and
   the wrist-rest part includes an engagement groove at a rear portion thereof so as to serve as the fourth engagement piece to be engaged with the protrusion and an engagement protrusion formed at a front portion thereof so as to serve as the third engagement piece to be engaged with the engagement hole and is configured to be detachably attached onto the hand-rest part.

4. The embedding apparatus according to claim 3, wherein the wrist-rest part comprises a lid opening mechanism for opening a lid of a cassette configured to accommodate a sample, and the lid opening mechanism includes one end portion provided at a position lower than a bottom surface of the lid in a state in which the cassette closed by the lid is placed at a predetermined position on the hot plate, and an inclined surface extending from the one end portion to a position higher than the bottom surface of the lid.

5. The embedding apparatus according to claim 4, wherein the inclined surface is inclined in a front-rear direction parallel to a direction opposing the cassette.

6. The embedding apparatus according to claim 4, wherein the lid opening mechanism includes a flip-flop preventing part formed into a canopy top shape above a position of the inclined surface in the vicinity of a portion aligned in height with the bottom surface of the lid.

7. The embedding apparatus according to claim 1, wherein the wrist-rest part is formed into an inclined shape in which an upper surface is declined as it goes away from the cold spot.

8. The embedding apparatus according to claim 1, wherein the wrist-rest part is provided with an elastic material between a top surface portion and a bottom surface portion, the bottom surface portion is provided with a pressure-sensitive adhesive material, and is configured to be detachably attached onto the hand-rest part by a pressure-sensitive adhesive force of the bottom surface portion.

9. The embedding apparatus according to claim 8, wherein the wrist-rest part includes the top surface portion made of a resin material having a convex shape protruding upward, and the bottom surface portion made of a resin material which also serves as both the elastic material and the pressure-sensitive adhesive material.

10. The embedding apparatus according to claim 1, further comprising a wrist-rest cushion part detachably attached onto the wrist-rest part.

11. The embedding apparatus according to claim 10, wherein the wrist-rest cushion part is provided with an elastic material between a top surface portion and a bottom surface portion, the bottom surface portion is provided with a pressure-sensitive adhesive material, and is configured to be detachably attached onto the wrist-rest part by a pressure-sensitive adhesive force of the bottom surface portion.

* * * * *